Nov. 12, 1929.　　　　N. SPEIRS　　　　1,735,801
LANDSCAPE
Filed May 11, 1928

INVENTOR.
N. Speirs.
BY
F. W. Bryant,
ATTORNEY.

Patented Nov. 12, 1929

1,735,801

UNITED STATES PATENT OFFICE

NELLIE SPEIRS, OF SARASOTA, FLORIDA

LANDSCAPE

Application filed May 11, 1928. Serial No. 276,920.

My invention has for its object to provide a highly artistic landscape or scene having the natural growth, such as trees, vegetable undergrowth and flowers, represented and formed in a very pleasing and artistic manner by sponge in thin sheet-like form.

More particularly, the present invention aims to provide a scene in which the physical and color characteristics of the trees, undergrowth and flowers, are effected by varying the thickness of and painting or otherwise coloring the sponge.

A still further object is to provide a landscape or scene embodying a backing or mat upon which the sky, buildings, persons and the like are represented by painting, sketching or the like, and upon which is secured suitably colored sponge in thin sheet-like form to represent the natural growth of the scene with its physical and color characteristics.

The invention consists in the novel features hereinafter more fully described, illustrated in the accompanying drawing and claimed.

Figures 1, 2, 3:
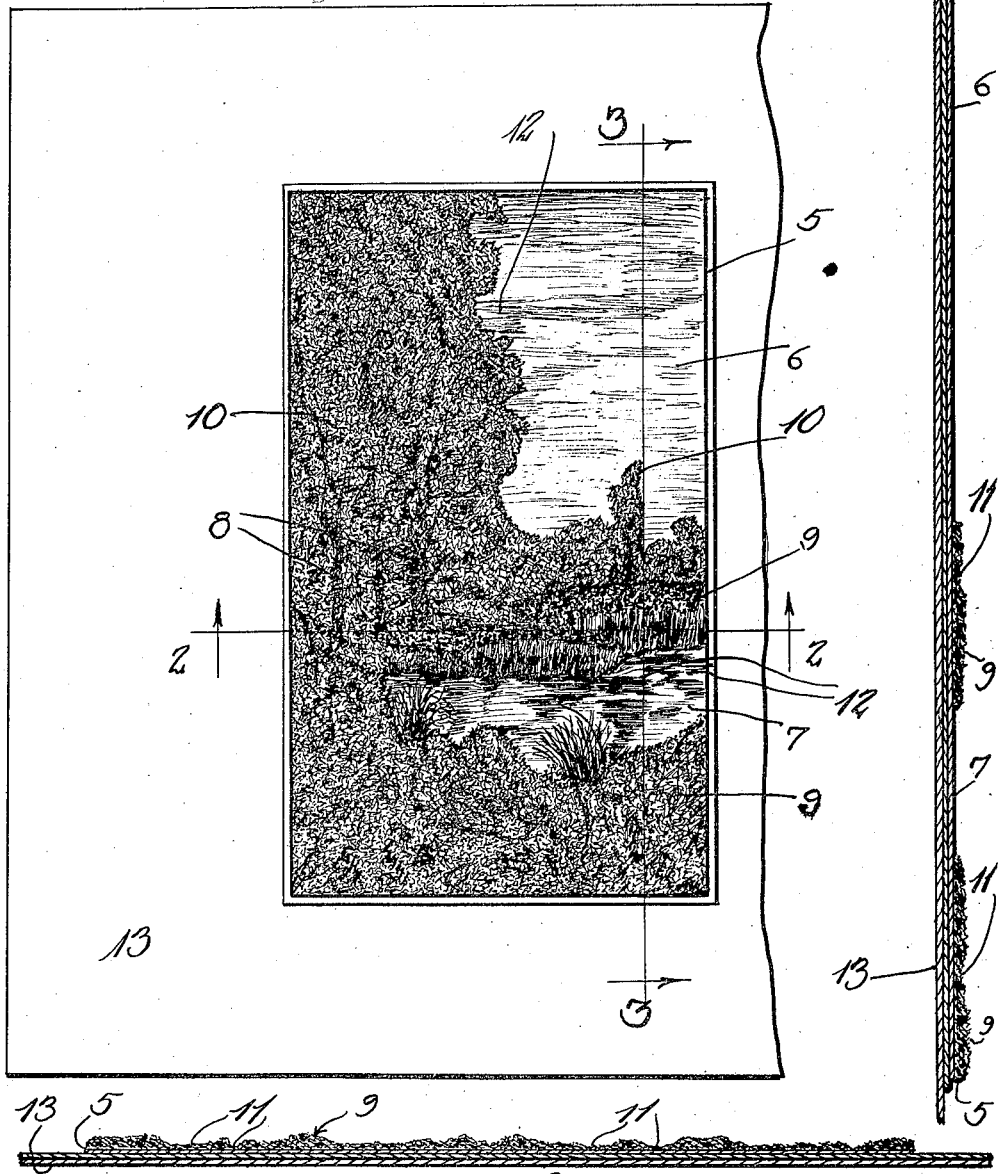
Figure 1 is a face view of a landscape formed in accordance with the present invention.
Figure 2 is an enlarged horizontal section taken on line 2—2 of Figure 1.
Figure 3 is an enlarged vertical section taken on line 3—3 of Figure 1.

In the practice of the present invention, a scene is painted or sketched upon a suitable mat or backing 5 of cardboard, wood, or the like. As shown, the sky and a body of water may be thus represented as respectively indicated at 6 and 7. Upon the mat 5, I then glue or otherwise secure sponge in thin sheet-like form to represent the natural growth of the scene, the sponge being suitably painted or colored to bring out the color characteristics of the natural growth, such as the various colors of the foliage, flowers and the like, and to also bring out certain physical characteristics such as the trunks 8 of the trees and the like. The sponge is thus employed and arranged to indicate flowers and undergrowth as indicated generally at 9, and trees 10 in the back ground. To further bring out physical characteristics of the natural growth and to emphasize the variations in density of the foliage and the like, the sponge is thinned at different places as generally indicated at 11.

In practice, the sponge is preferably colored before being applied to the mat 5, after which it is retouched to give a finished and final artistic appearance. At this time, the scene is also preferably retouched as at 12 to bring out the lights and shadows of the sky 6 and of the body of water 7 adjacent the natural growth.

By properly preparing, coloring and applying the sponge, a very pleasing and artistic scene or landscape is produced which, at a distance, cannot be easily distinguished from an elaborate oil painting.

The entire picture, when completed, may be mounted in any suitable manner, but is shown secured upon a carrying sheet or folder 13. Due to the natural characteristics of the sponge and the employment of the same in thin sheet-like form, a durable picture is had in which the sponge will remain in proper condition for a great length of time without liability of becoming warped or detached.

It is to be understood that the present disclosure is for illustrative purposes only, and that numerous different scenes or landscapes may be formed in accordance with the invention. Moreover, the scene may obviously include buildings, persons, vehicles and the like represented by painting or sketching them on the mat before the sponge is applied.

What I claim as new is:—

1. A device of the class described comprising a mat having a scene thereon, and sponge in thin sheet-like form secured upon the face of said mat to represent the natural growth of the scene, said sponge being colored to represent color and physical characteristics of the growth.

2. A device of the class described comprising a mat having a scene thereon, and sponge in thin sheet-like form secured upon the face of said mat to represent the natural growth of the scene, said sponge being colored to represent color and physicial characteristics of the growth, and being further varied in thickness at different points to represent variations in density of the growth.

3. A landscape device comprising a mat having a scene painter thereon, and sponge applied to the face of the mat to represent the trees, undergrowth and flowers of the scene, said sponge being colored to represent color and physical characteristics of the trees, flowers and undergrowth.

4. A scene having trees and undergrowth represented by sponge in thin sheet-like form, the sponge being colored to represent color and physical characteristics of the trees and undergrowth.

In testimony whereof I affix my signature.

NELLIE SPEIRS.